(12) United States Patent  (10) Patent No.: US 8,070,089 B2
Ferrier  (45) Date of Patent: Dec. 6, 2011

(54) HYBRID HELICOPTER THAT IS FAST AND HAS LONG RANGE

(75) Inventor: Jean-Jacques Ferrier, Velaux (FR)

(73) Assignee: Eurocopter, Marignane Cedex (FR)

( * ) Notice: Subject to any disclaimer, the term of this patent is extended or adjusted under 35 U.S.C. 154(b) by 352 days.

(21) Appl. No.: 12/409,948

(22) Filed: Mar. 24, 2009

(65) Prior Publication Data

US 2010/0065677 A1 Mar. 18, 2010

(30) Foreign Application Priority Data

Mar. 25, 2008 (FR) ...................................... 08 01613

(51) Int. Cl.
  *B64C 27/22* (2006.01)
(52) U.S. Cl. ........... 244/6; 244/7 A; 244/7 R; 244/45 A; 244/17.11
(58) Field of Classification Search ............... 244/6, 7 A, 244/7 R, 17.11, 23 R, 45 A, 60; D12/326, D12/327, 331, 339
  See application file for complete search history.

(56) References Cited

U.S. PATENT DOCUMENTS

| | | | |
|---|---|---|---|
| 3,385,537 A | | 5/1968 | Lichten et al. |
| 3,426,982 A | | 2/1969 | Markwood |
| 3,540,680 A | | 11/1970 | Peterson |
| 3,698,666 A | | 10/1972 | Monti |
| 3,954,231 A | * | 5/1976 | Fraser ........................... 244/225 |
| 5,454,530 A | * | 10/1995 | Rutherford et al. ........... 244/7 A |
| 5,454,531 A | * | 10/1995 | Melkuti ....................... 244/12.6 |
| 5,873,545 A | * | 2/1999 | Kapin et al. ................. 244/12.3 |
| 6,471,158 B1 | | 10/2002 | Davis |
| 6,561,456 B1 | * | 5/2003 | Devine ........................ 244/12.1 |
| 6,974,106 B2 | * | 12/2005 | Churchman ................. 244/12.6 |
| 7,267,300 B2 | * | 9/2007 | Heath et al. .................. 244/12.3 |
| 2002/0011539 A1 | | 1/2002 | Carter, Jr. |
| 2007/0170307 A1 | * | 7/2007 | de la Cierva Hoces ....... 244/7 R |

FOREIGN PATENT DOCUMENTS

| | | |
|---|---|---|
| CN | 1078557 A | 1/2002 |
| CN | 1978277 A | 6/2007 |
| DE | 20303024 | 8/2003 |
| WO | 2007014531 | 2/2007 |

OTHER PUBLICATIONS

French search report in corresponding FR 0801613.

* cited by examiner

*Primary Examiner* — Timothy D Collins
*Assistant Examiner* — Jamie S Stehle
(74) *Attorney, Agent, or Firm* — Brooks Kushman P.C.

(57) ABSTRACT

A hybrid helicopter (1) includes a central fuselage (2) defining a front end (3) and a rear end (4), the hybrid helicopter (1) having a main lift rotor (10), an additional lift surface (20), a mechanical interconnection system (40), and at least one turbine engine (61, 62) for continuously driving the main rotor (10) in rotation. Furthermore, the main rotor (10) is mechanically connected to the mechanical interconnection system (40) by rotary rotor mast (12), and the additional lift surface (20) is arranged at the rear of the hybrid helicopter (1) between the rotor mast (12) and the rear end (4) of the fuselage (2), each end zone (21', 22') of the wings (21, 22) of the additional lift surface (20) being provided with a vertical element (23, 24) fitted with a rudder (23', 24').

14 Claims, 1 Drawing Sheet

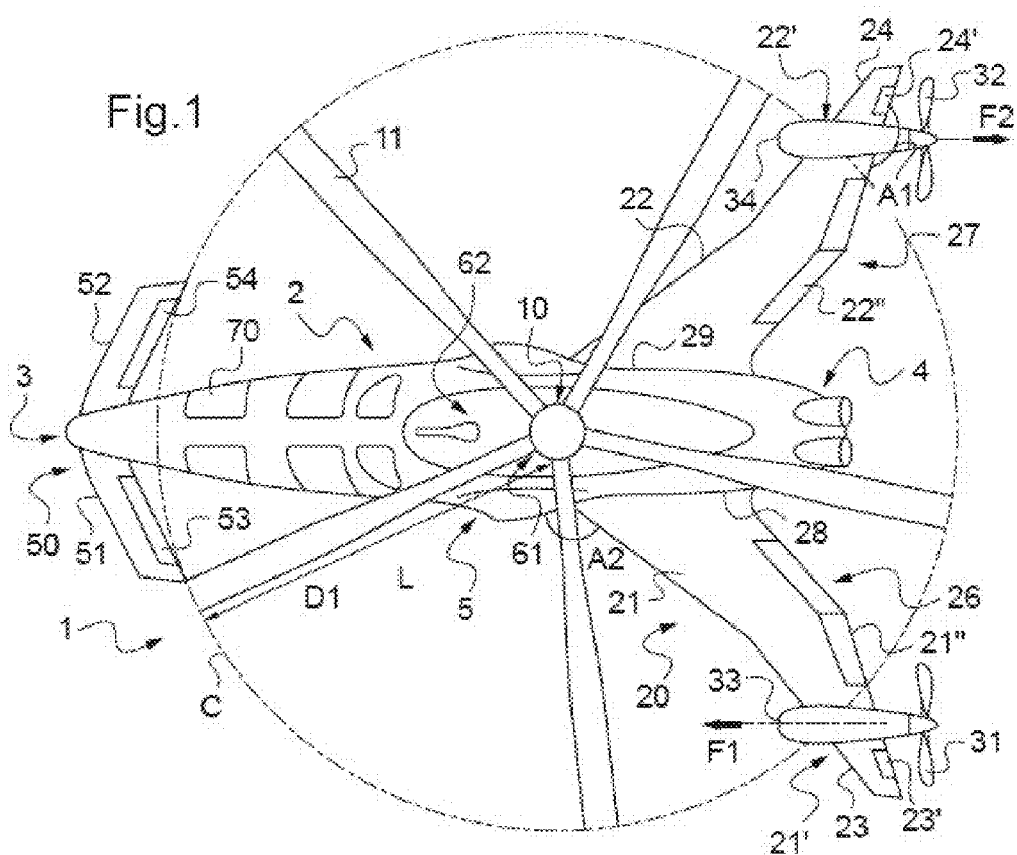
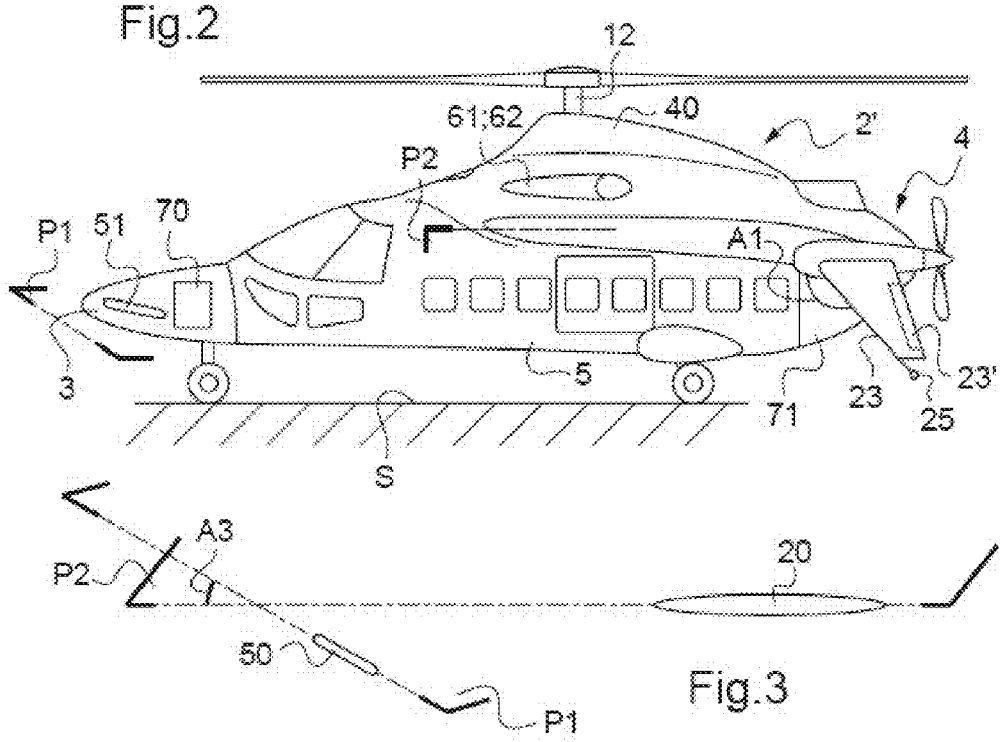

HYBRID HELICOPTER THAT IS FAST AND HAS LONG RANGE

FIELD OF THE INVENTION

The present invention relates to a long-range rotorcraft with a high cruising speed.

BACKGROUND OF THE INVENTION

More particularly, the invention relates to a hybrid helicopter of the vertical takeoff and landing (VTOL) advanced concept type of aircraft. Given the specificity of the invention, its technical field is restricted to vertical takeoff and landing rotorcraft having a main lift rotor acting as a rotary wing, and the technical field does not extend to airplanes, for example, regardless of whether or not they permit vertical takeoff and landing.

Indeed, the aerodynamic constraints and problems to be solved, e.g. on rotary wing aircraft, differ significantly from the constraints and problems encountered with fixed wing aircraft, which explains why they are not included in the technical field of the invention.

This advanced concept of a hybrid helicopter combines, at reasonable cost, the efficiency of a conventional helicopter in vertical flight with high speed travel performance made possible by the use of pusher propellers and the installation of modern turbine engines.

In order to understand the object of the invention, it is appropriate to summarize the main flying machines that correspond to airplanes and to rotorcraft.

The term "rotorcraft" is used to designate any aircraft for which lift is provided in full or in part by one or more substantially vertical axis propellers of large diameter, referred to as rotors or as rotary wings.

Within the category of rotorcraft, several distinct types can be distinguished.

Firstly, there is the helicopter in which at least one main rotor driven by an appropriate engine provides both lift and propulsion. A helicopter is capable of hovering, i.e. remaining at a stationary point in three dimensions, it can take off and land vertically, and it can move in any direction (forwards, backwards, sideways, up, down). The great majority of rotorcraft that are produced in the world are helicopters.

Then the autogyro is a rotorcraft in which the rotor does not receive power, but provides lift by auto-rotating under the effect of the forward speed of the aircraft. Propulsion is provided by a turbine engine or by a propeller having a substantially horizontal axis in forward flight that is driven by a conventional engine. This formula is incapable of vertical flight, except when the rotor is initially launched by an auxiliary device enabling the rotor to be rotated faster than normal: an autogyro therefore cannot perform hovering flight, but is capable of moving up or down on paths of very steep slope. It could be said to be an airplane with a wide range of speeds that does not suffer from stalling and that can use short runways.

A gyrodyne is a rotorcraft that is intermediate between a helicopter and an autogyro, with a rotor that provides only lift. The rotor is normally driven by an engine installation during stages of takeoff, hovering or vertical flight, or landing, like a helicopter. A gyrodyne also has an additional propulsion system that is essentially different from the rotor assembly. In forward flight, the rotor continues to provide lift, but only in auto-rotation, i.e. without power being transmitted to said rotor. The Jet gyrodyne from the manufacturer Fairey is an embodiment of this concept.

Various other novel formulae have been investigated to a greater or lesser extent, some of which have given rise to practical embodiments.

In this respect, mention can be made of the compound that takes off and lands like a helicopter, and cruises like an autogyro: its rotor also rotates because of the forward speed of the aircraft and provides part of its lift, while the remainder is provided by an auxiliary wing. A puller propeller having a substantially horizontal axis delivers the force needed to move in translation. As an example, mention can be made of the experimental compound SO 1310 Farfadet having its rotor propelled by jet propulsion in a takeoff or landing configuration and also rotating in a cruising configuration, propulsion then being provided by a propeller. That aircraft has two separate turbines for actuating the rotor and the propeller.

Similarly, document U.S. Pat. No. 6,513,752 discloses an aircraft comprising:
  a fuselage and a wing;
  two variable-pitch propellers;
  a rotor with weights "at its ends" (sic);
  a power source driving the two propellers and the rotor;
  control means for adjusting the pitch of the propeller such that:
    in forward flight, the thrust from the propellers causes the aircraft to move forward; and
    in hovering flight, the anti-torque function is performed by one propeller providing thrust towards the front of the rotorcraft and the other towards the rear of the rotorcraft, and the rotor is driven by the power source; and
  the power source comprises an engine and a clutch, which by disconnecting the rotor from the engine, enables the rotor to turn faster than an outlet from said engine, because of the above-mentioned weights.

Additionally, it is stated that the clutch makes autogyro mode in forward flight possible. Consequently, the aircraft according to document U.S. Pat. No. 6,513,752 is of the compound type.

In addition, the power transmission gearbox disposed between the power source and the propellers enables said propellers to operate at a plurality of speeds of rotation relative to the speed of an outlet from said power source.

Another particular formula for a rotorcraft is the convertible. This term covers all rotorcraft that change configuration in flight: takeoff and landing in helicopter configuration, cruising flight in airplane configuration, e.g. with two rotors that are tilted through about 90° in order to act as propellers. The tilting rotor formula has given rise to the Bell Boeing V22 Osprey aircraft, for example.

Of these various rotorcraft formulae, the helicopter is the simplest, such that is the most widespread in spite of the fact that the maximum forward speed of a helicopter is about 300 kilometers per hour (km/h), which is slow and less than the speed that can be envisaged with formulae of the compound or convertible types, which are technically more complex and more expensive.

Another innovative formula is known that is referred to as a "hybrid helicopter", for convenience.

The hybrid helicopter comprises a fuselage with a cockpit at its front, a main rotor for driving blades in rotation by using at least one turbine engine, and advantageously by using two turbine engines placed on the top of the fuselage one either side of the longitudinal plane of symmetry of the aircraft.

The hybrid helicopter also has a set of wings made up of straight (i.e. non-swept) wings disposed on either side of the fuselage. Two pusher propellers are placed on either side of the fuselage, on the wings.

Furthermore, the hybrid helicopter has a tail boom with stabilizer and control surfaces at its end, and in particular: for controlling pitch, a horizontal stabilizer surface with two pitch control surfaces that are movable relative to the front portion; and, for steering, two appropriate fin surfaces, e.g. substantially vertical surfaces, on respective sides of the horizontal stabilizer.

Specifically, the horizontal stabilizer and the vertical stabilizers form an upside-down U-shape relative to the fuselage.

Furthermore, the hybrid helicopter is fitted with an integrated drive system that, in addition to comprising the two turbine engines, the rotors, and the two propellers, also comprises a mechanical interconnection system between those elements.

In that configuration, the hybrid helicopter is remarkable in that the speeds of rotation of the turbine engine outlets, of the propellers, of the rotor, and of the mechanical interconnection system are mutually proportional, with the proportionality ratio being constant regardless of the flying configuration of the hybrid helicopter under normal conditions of operation of the integrated drive system.

Consequently, and advantageously, the rotor is continuously driven in rotation by the turbine engine(s), and always develops lift regardless of the configuration of the hybrid helicopter, both in forward flight and when hovering. The hybrid helicopter is thus neither an autogyro, nor a gyrodyne, nor a compound, but is a novel type of rotorcraft.

More precisely, the rotor serves to provide all of the lift of the hybrid helicopter during stages of takeoff, landing, and hovering, and some of its lift in cruising flight, the wing then contributing some of the lift of said hybrid helicopter.

Thus, the rotor provides the major fraction of the lift of the hybrid helicopter in cruising flight, and possibly also makes a small contribution to propulsion or traction forces, while minimizing drag.

The anti-torque and steering control functions are performed by making use of differential thrust exerted by the propellers. In vertical flight, the propeller on the left of the fuselage exerts thrust towards the rear of the hybrid helicopter while the propeller on the right produces thrust towards the front, assuming that the rotor turns clockwise.

The hybrid helicopter makes it possible not only to perform missions that take a long time in vertical flight or in cruising flight at high speed, but also makes it possible to have long range, while still being capable of hovering and taking off vertically.

Nevertheless, the propellers are close to fuselage, which gives rise to noise nuisance for the passengers of a hybrid helicopter.

In addition, the tail boom can give rise to vibration known to the person skilled in the art as "tail shake". It should be observed that this "tail shake" phenomenon applies to rotorcraft only.

In practice, the main rotor behaves like an aerodynamic exciter. Thus, its wake is turbulent. Turbulence corresponds to variations in pressure, speed, and angle of incidence of the slipstream, which variations are distributed over a rather wide range of relatively high frequencies.

The wake behind the main rotor of the hybrid helicopter is pulsed at the fundamental frequency equal to the product $b \times \Omega$, where b is the number of blades of the main rotor and $\Omega$ is the speed of rotation of the rotor.

Nevertheless, frequencies that are harmonics of $b \times \Omega$ may possibly also appear.

Under such conditions, the tail surfaces are subjected simultaneously to such aerodynamic excitation, thereby leading directly to exciting resonance modes of the helicopter structure.

It should also be observed that the exhaust gas leaving the turbine engines heats the rear structural assemblies comprising the tail boom and the tail surfaces, which can give rise to problems in finding materials to constitute these rear structural assemblies.

The vibration that results from "tail shake" can also be a source of discomfort for passengers. The "tail shake" phenomenon is then combated with the help of active devices, e.g. devices that act on the tail surfaces or indeed on the tail boom.

OBJECT AND SUMMARY OF THE INVENTION

An object of the present invention is to propose a rotorcraft, and more particularly a hybrid helicopter, that enables the above-mentioned limitation to be overcome, while considerably increasing passenger comfort compared with the existing formula.

The hybrid helicopter is preferably capable of performing missions efficiently during long periods of vertical flight and of performing cruising flights at high speed while also enabling long ranges to be covered, and while providing acceptable comfort for its passengers.

According to the invention, a hybrid helicopter comprises a central fuselage defining with a front end and a rear end, the hybrid helicopter comprising:

a main lift rotor provided with a plurality of blades, arranged above the fuselage;

an additional lift surface provided with first and second wings extending on either side of the fuselage from respective root zones to respective end zones, each wing being provided with a propeller;

a mechanical interconnection system between the main rotor and the propellers; and at least one turbine engine for continuously driving the main rotor and the propellers in rotation by meshing with the mechanical system.

The claimed aircraft is thus indeed a hybrid helicopter, and not an autogyro, a gyrodyne, or a compound, insofar as the main rotor is continuously driven in rotation by the turbine engine(s).

This hybrid helicopter is remarkable in that the main rotor is mechanically connected to the mechanical interconnection system via a rotary rotor mast, the additional lift surface being arranged at the rear of the hybrid helicopter, i.e. between the rotor mast and the rear end of the fuselage. Furthermore, the hybrid helicopter is provided with a stabilizer surface arranged at the front end of the fuselage.

Consequently, the propellers arranged on the wings are no longer close to the passengers of the hybrid helicopter and no longer degrade their comfort.

In addition, the propellers contribute conventionally to propelling the hybrid helicopter so as to give it a high forward speed.

In addition, the hybrid helicopter of the invention does not have any tail boom or tail structures.

By adjusting the thrust difference between the propellers, the pilot can counter the torque exerted by the main rotor and can thus control the hybrid helicopter in yaw, in the same manner as would otherwise be done with an anti-torque rotor.

Furthermore, the propellers are controlled in such a manner as to stabilize the hybrid helicopter in yaw, thereby compensating for the absence of a vertical tail surface.

Finally, the stabilizing surface advantageously replaces conventional horizontal tail surfaces by constituting an additional lift surface enabling the helicopter to be stabilized and improving the comfort of people on board.

Thus, the complete absence of a tail boom enables passenger comfort to be improved since the hybrid helicopter does not suffer from the unwelcome "tail shake" effect, which effect has previously been combated by active devices that are expensive and heavy.

The combination, as contrasted with mere juxtaposition, of the wings and a stabilizer surface arranged at the front of the hybrid helicopter is completely novel and inventive in the field of helicopters for improving passenger comfort, and more particularly in the field of hybrid helicopters, for which eliminating the tail boom was essentially unthinkable.

It should also be observed that this combination presents numerous additional advantages, such as improved safety. The pusher propellers of the hybrid helicopter are no longer level with the passenger cabin or the cockpit, so safety is increased.

Furthermore, by sweeping the wings strongly towards the rear of the fuselage, the side walls of the fuselage are left clear, thereby making it possible, for example, to install optional equipment, e.g. a winch.

Furthermore, the stabilizer surface creates "free" lift, thereby enabling the payload of the hybrid helicopter to be increased compared with a conventional machine.

In addition, the stabilizer surface makes it possible to adjust the center of lift of the assembly comprising the wings and the stabilizer surface, and this constitutes a particularly important advantage since the wings are set very far back. Thus, the center of lift of the assembly comprising the wings and the stabilizer surface coincides with the center of lift of the main rotor. As a result, accelerating the hybrid helicopter does not run the risk of causing it to nose-dive as a because of the resulting increase in the lift of the wings.

Furthermore, the stabilizer surface comprises one or more stabilizer elements.

Thus, the stabilizer surface may be provided with a single stabilizer element extending on either side of the fuselage.

However, it can be advantageous for the stabilizer surface to be provided with first and second stabilizer elements extending from either side of the front end of the fuselage to make it easier to install, the first and second stabilizer elements each extending on one side only of the fuselage.

The stabilizer surface is then optionally provided with at least one horizontal control surface, e.g. a stabilizer control surface.

Advantageously, the stabilizer surface is contained in a first plane, the additional lift surface being contained in a second plane, the first plane presenting a third angle relative to the second plane so that the stabilizer surface possesses an angle of incidence relative to the relative air flow that is greater than the angle of incidence of the additional lift surface.

Consequently, the additional lift surface of the hybrid helicopter does not run any risk of stalling, which could lead to a catastrophic situation.

When the wings of the additional lift surface are in a high-incidence configuration, e.g. if the helicopter is in a strongly nose-up attitude while climbing, the stabilizer surface will have a slightly greater angle of incidence given its initial position.

Under such circumstances, the stabilizer element(s) will stall before the wings of the additional support surface stall in turn. The stabilizer elements stalling will have the direct effect of bringing the hybrid helicopter back to a more level attitude, and thus of bringing the wings of the additional lift surface into a smaller incidence configuration, thereby avoiding any risk of the wings stalling. It can thus be seen that the stabilizer elements have a natural stabilizing effect.

Finally, the stabilizer surface, and thus the surface of the or each stabilizer element is preferably located outside the stream that passes through the main rotor, such that a minimum first distance between said stabilizer surface and the rotor mast is greater than or equal to the length of the blades.

This characteristic turns out to be most ingenious and beneficial to stabilizing the hybrid helicopter by avoiding the "attitude hump" phenomenon named "bosse d'assiette" in French language.

With a traditional helicopter, whether hybrid or not, when it is in level flight, the air passing through the main rotor is deflected rearwards and strikes the tail associated with the tail boom. This air thus exerts forces on the tail that the pilot compensates by working the controls.

Nevertheless, when flying conditions vary, the extent to which the air passing through the main rotor is deflected is also modified. The same applies to the forces exerted on the tail.

During acceleration, the attitude hump tends to cause the helicopter's nose to rise. In order to conserve speed, the pilot pushes the cyclic control stick forwards to bring the nose back down again.

Conversely, while decelerating, the attitude hump tends to cause the helicopter to go nose-down. In order to avoid accelerating, the pilot then pulls on the cyclic control stick.

Thus, by arranging the stabilizer surface outside the stream from the main rotor there is no risk of this "attitude hump" phenomenon appearing.

The present invention may also present one or more of the following additional characteristics.

Each wing of the additional lift surface may be provided with a vertical element at the tip of its end zone, i.e. at its end remote from the fuselage. Such vertical elements are sometimes referred to as "winglets".

These vertical elements block air flow and thus reduce the turbulent wing tip vortex. As a result the vertical elements improve levels of vibration in the hybrid helicopter, and thus improve its comfort.

In addition, these vertical elements contribute to stabilizing the hybrid helicopter in yaw, with their effectiveness increasing with increasing speed of the hybrid helicopter.

In addition, it is possible to envisage fitting each vertical element with a rudder. The rudders of the vertical elements provide the pilot of the hybrid helicopter with means for controlling yaw.

Consequently, the vertical elements and the associated rudders contribute to stabilizing and controlling the hybrid helicopter. These operations thus no longer rely entirely on the propellers.

Furthermore, the vertical elements advantageously present a first angle relative to the corresponding wing that is obtuse, these vertical elements optionally forming a negative dihedral directed towards the ground when the hybrid helicopter is on the ground, and possibly also contributing to optimizing centering of the hybrid helicopter.

Thus, the vertical elements improve the comfort and the safety of people moving close to the hybrid helicopter, e.g. ground maintenance crews. The same applies to the passengers who need to come close to the rotating propellers while embarking or disembarking.

Propellers represent a permanent danger while they are in rotation. Consequently, people must always pay attention not to come too close to the propellers. The fear and the attention that results therefrom constitute a genuine source of discomfort for the people involved.

The vertical elements considerably reduce the risk and the discomfort that stems therefrom, since they necessarily keep such people away. By forming a negative dihedral, the vertical elements create a kind of safety barrier.

Furthermore, in order to keep the propellers as far as away as possible from the fuselage, the wings are swept back so as to present a second angle relative to the fuselage and so as to be located towards the rear of the fuselage.

Similarly, the propellers are advantageously pusher propellers and thus located towards the rear of the hybrid helicopter, each propeller thus being located beside the trailing edge of the corresponding wing.

The noise generated by the propellers is then greatly attenuated, at least so far as the passengers of the hybrid helicopter are concerned. There is no need to provide active devices for limiting noise, since comfort is already ensured.

Furthermore, even in the improbable circumstances of a propeller breaking up, whether on the ground or in flight, the occupants of the hybrid helicopter remain out of danger since the propellers are situated behind the cabin. Only structural damage is to be feared.

The invention thus optimizes comfort for passengers as well as improving their safety.

To increase the positive effect of the invention, each propeller is therefore arranged at the end zone of the corresponding wing.

Furthermore, each vertical element is provided with an element for supporting the hybrid helicopter relative to the ground, a tail wheel or skid, for example.

On landing, the propellers might touch the ground if the hybrid helicopter takes up an excessively nose-up attitude. The support element serves naturally to limit this nose-up attitude to a limit value that ensures that the propellers, or even the rear end of the fuselage, cannot come into contact with the ground, which would have the consequences of causing the propellers to break up and of damaging the fuselage.

Similarly, under circumstances of excessive roll on the ground, the support elements limit roll to a maximum value that ensures that the propellers or the vertical means do not come into contact the ground.

Rather than adding uncomfortable protection in the fuselage for the purpose of ensuring that the occupants of the hybrid helicopter remain unscathed in the event of an excessively nose-up attitude, it suffices merely to provide tail wheels or skids at the ends of the vertical elements.

Advantageously, such support elements also have the capacity to absorb impact energy so as to avoid or at least limit structural damage during situations of excessive roll or nose-up attitude on the ground.

Finally, since the invention relates to a hybrid helicopter, the speeds of rotation of the outlet from at least one turbine engine, of the at least one propeller, of the rotor, and of the mechanical interconnection system are mutually proportional, with the proportionality ratio remaining constant whatever the flying configuration of the hybrid helicopter in normal operating conditions.

BRIEF DESCRIPTION OF THE DRAWINGS

The invention and its advantages appear in greater detail in the context of the following description of an embodiment given by way of illustration and with reference to the accompanying figures, in which:

FIG. 1 is a plan view of a hybrid helicopter of the invention;

FIG. 2 is a side view of the hybrid helicopter of the invention; and

FIG. 3 is a diagram showing the different angles of incidence of the stabilizing surface and of the additional lift surface.

Elements that are shown in more than one of the figures are given the same references in each of them.

MORE DETAILED DESCRIPTION

FIGS. 1 and 2 are a plan view and a side view of a hybrid helicopter 1 of the invention.

The hybrid helicopter comprises a central fuselage 2 that extends from a front end 3 to a rear end 4. A cabin 5 located between the front and rear ends 3 and 4 of the fuselage 2 occupies the inside of the fuselage 2 to house crew members of the hybrid helicopter 1, and also passengers.

In addition, the hybrid helicopter has a main rotor 10 with a plurality of blades 11. The rotor mast 12 of the main rotor 10 is driven by an engine installation comprising first and second turbine engines 61, 62 via a mechanical interconnection system 40.

In FIG. 2, it can be seen that the first and second turbine engines 61 and 62, together with the mechanical interconnection system 40, are arranged in the top portion 2' of the fuselage 2, above the cabin 5.

Similarly, the main rotor 10 is naturally arranged above the fuselage 2.

Furthermore, the hybrid helicopter 1 has an additional lift surface 20 provided with first and second wings 21 and 22 extending on either side of the fuselage 2.

More precisely, these first and second wings 21 and 22 are arranged at the rear of the fuselage 2 between the rotor mast 12 and the rear end 4 of the fuselage 2.

In addition, the first and second wings 21 and 22 of the additional support surface 20 extend from the fuselage 2 in a direction presenting a second angle A2 relative to the fuselage. This second angle enables the first and second wings 21 and 22 to be swept back in such a manner that the wings are directed towards the rear of the helicopter 1, i.e. towards the rear end 4 of the fuselage 2.

Finally, the first and second wings 21 and 22 are in the high position, i.e. above the cabin 5 so as not to impede the visibility of the passengers, and thus their comfort.

It should also be observed that the first and second wings 21 and 22 are each provided in succession, going from the fuselage 2 towards their free ends, with a root zone 28, 29, an intermediate zone 26, 27, and then an end zone 21', 22'.

The intermediate zone 26, 27 of each wing 21, 22 is provided with ailerons at its trailing edge 21", 22". These ailerons can be inclined to reduce the area projected on the ground by the first and second wings 21, 22 while hovering or flying at low speed, so as to reduce the loss of lift from the main rotor 10 induced by the wings disturbing the flow from the rotor.

Each end zone 21', 22' has a respective propeller 31, 32 followed by a vertical element 23, 24. The first end zone 21' of the first wing 21 thus possesses a first propeller 31, while the second end zone 22' of the second wing 22 is provided with a second propeller 32.

The first and second propellers 31 and 32 operate in pusher mode and they are arranged respectively beside the trailing edge 21", 22" of the corresponding first or second wing 21, 22 so as to point towards the rear of the hybrid helicopter 1.

These first and second propellers 31, 32 are driven by the turbine engines 61, 62 via the mechanical interconnection system. The first and second turbine engines 61, 62 mesh with the mechanical interconnection system 40 that drives not only the main rotor 10 in rotation via the rotor mast 20, but also drives the first and second propellers 31, 32 in rotation via first and second mechanical transmission systems.

At the propellers, the corresponding transmission system is arranged in a respective fairing 33, 34. It should be observed that these fairings also cover devices enabling the pitch of the blades of the first and second propellers 31, 32 to be varied.

Since the helicopter 1 is a hybrid helicopter, the main rotor is continuously driven in rotation by the mechanical interconnection system 40. The speeds of rotation of the outlet from the first and second turbine engines 61, 62, of the first and second propellers 31, 32, of the main rotor 10, and of said mechanical interconnection system 40 are mutually proportional, with the proportionality ratio being constant whatever the flying configuration of the hybrid helicopter 1 under normal conditions of operation.

When flying forwards, the propellers exert thrust towards the rear of the hybrid helicopter 1 in order to propel it forwards. In contrast, it is possible to hover by reversing the thrust from one propeller. For example, the first propeller 31 of the first wing 21 exerts thrust towards the front of the hybrid helicopter 1 along arrow F1 while the second propeller 32 of the second wing 22 exerts thrust towards the rear of the hybrid helicopter 1 along arrow F2.

Furthermore, each vertical element 23, 24 of the first and second wings 21, 22 advantageously includes a rudder 23', 24' enabling the hybrid helicopter 1 to be controlled in yaw.

These vertical elements 23, 24 present a first angle A1 relative to the corresponding wing 21, 22, with a negative dihedral directed towards the ground S. In order to avoid damaging the propellers by the hybrid helicopter taking up an excessively nose-up attitude during takeoff or landing, each vertical element 23, 24 is provided with a support element 25, e.g. a tail wheel. The support element 25 thus keeps the nose-up attitude of the hybrid helicopter below a limit value that guarantees that the propellers remain intact.

Since the hybrid helicopter 1 does not have a tail boom, and therefore does not have the conventional stabilizers of a helicopter, the hybrid helicopter 1 is advantageously provided with a stabilizer surface 50 comprising first and second stabilizer elements 51, 52 that project from either side of the fuselage 2 at its front end 3.

These first and second stabilizer elements 51, 52 constitute a third lift surface, the first and second lift surfaces being constituted respectively the main rotor 10 by the additional lift surface 20.

Furthermore, each stabilizer element 51, 52 of the stabilizer surface 50 includes a horizontal control surface 53, 54 that enables it to replace the horizontal stabilizer conventionally arranged at the end of the tail boom of a helicopter, whether hybrid or otherwise.

In order to avoid the hybrid helicopter stalling, the first plane P1 containing the first and second stabilizers elements 51, 52 of the stabilizer surface 50 presents a third angle A3 as shown in FIG. 3 relative to a second plane P2 containing the wings 21, 22 of the additional lift surface 20.

More precisely, the third angle A3 is such that the first and second stabilizers elements 51, 52 present an angle of incidence that is greater than the angle of incidence of the first and second wings 21, 22 relative to relative air flow.

Finally, in plan view, it can be seen in FIG. 1, that the first and second stabilizers elements 51, 52 are arranged at the periphery of the circle C described by the free ends of the blades 11 of the main rotor 10, and they lie outside said circle.

The first minimum distance D1 between each stabilizer element 51, 52 (and thus the stabilizer surface 50) and the rotor mast 12 of the main rotor 10 is greater than or equal to, the length L of the blades 11 of the main rotor 10, and is equal thereto in the example shown diagrammatically.

Thus, the first and second stabilizers elements 51, 52 lie outside the flow of air passing through the main rotor 10. The first and second stabilizers elements 51, 52 are not impacted by said flow of air, and therefore do not generate an "attitude hump" phenomenon.

The distance of the front end 3 of the fuselage from the cabin 5 also presents the advantage of making it possible to provide a main bay 70 at the front of the hybrid helicopter 1. Similarly, eliminating the tail boom makes it possible to provide a secondary bay 71 at the rear end 4 of the fuselage 2.

Advantageously, the main bay 70 receives the avionics of the hybrid helicopter, while the secondary bay 71 can receive baggage so as to release space in the cabin 5 to improve passenger comfort.

Naturally, the present invention can be subjected to numerous variations as to its implementation. Although one embodiment is described above, it will readily be understood that it is not conceivable to identify exhaustively all possible embodiments. It is naturally possible to envisage replacing any of the means described by equivalent means without thereby going beyond the ambit of the present invention.

For example, the figures show a hybrid helicopter having first and second propellers.

In order to counter the torque generated by driving the main rotor 10 in rotation, one propeller exerts more thrust than the other when hovering. When flying forwards, the vertical elements may suffice to control the hybrid helicopter in yaw.

Nevertheless, in a variant of the invention, the hybrid helicopter could have a single propeller only, located on the first or the second wing as a function of the direction of rotation of the main rotor.

What is claimed is:

1. A hybrid helicopter comprising a central fuselage defining a front end and a rear end, said hybrid helicopter comprising:
    a main lift rotor provided with a plurality of blades, arranged above said fuselage;
    an additional lift surface provided with first and second wings extending on either side of said fuselage from respective root zones to respective wing tips, each wing being provided proximate its wing tip with a propeller, the main lift rotor being arranged above the additional lift surface;
    a mechanical interconnection system between said main rotor and said propellers; and
    at least one turbine engine for continuously driving said main rotor and said propellers in rotation by meshing with said mechanical system;
    wherein said main rotor is mechanically connected to the mechanical interconnection system via a rotary rotor mast, said additional lift surface is arranged at the rear of the hybrid helicopter between said rotor mast and said rear end of the fuselage, and said hybrid helicopter is provided with a stabilizer surface arranged at the front end of said fuselage.

2. A hybrid helicopter according to claim 1, wherein the center of lift of the assembly comprising the wings and the stabilizer surface coincides with the center of lift of said main rotor.

3. A hybrid helicopter according to claim 1, wherein said stabilizer surface is provided with first and second stabilizer elements extending on either side of the fuselage at its front end.

4. A hybrid helicopter according to claim 1, wherein said stabilizer surface includes at least one horizontal control surface.

5. A hybrid helicopter according to claim 1, wherein said stabilizer surface is arranged outside the flow passing through said main rotor, a first distance (D1) that separates said stabilizer surface from said rotor mast being greater than or equal to the length (L) of said blades.

6. A hybrid helicopter according to claim 1, wherein said stabilizer surface is contained in a first plane (P1) and the additional lift surface is contained in a second plane (P2), said first plane (P1) presenting a third angle (A3) relative to said second plane (P2) in such a manner that the stabilizer surface possesses an angle of incidence that is greater than the angle of incidence of the additional lift surface relative to relative air flow.

7. A hybrid helicopter according to claim 1, wherein an end zone of said wings of the additional lift surface is provided with a vertical element.

8. A hybrid helicopter according to claim 7, wherein each vertical element is fitted with a rudder.

9. A hybrid helicopter according to claim 7, wherein said vertical elements present a first angle (A1) relative to the corresponding wing that is obtuse, the vertical elements forming a negative dihedral directed towards the ground (S) when the hybrid helicopter is on the ground.

10. A hybrid helicopter according to claim 1, wherein said wings are swept back so as to present a second angle (A2) relative to the fuselage and so as to be directed towards the rear end of the fuselage.

11. A hybrid helicopter according to claim 1, wherein said propellers are in a pusher mode, each propeller being beside the trailing edge of the corresponding wing.

12. A hybrid helicopter according to claim 1, wherein each propeller is arranged inboard but proximate to the wing tip of the corresponding wing.

13. A hybrid helicopter according to claim 1, wherein each vertical element is provided with a support element for supporting the hybrid helicopter relative to the ground.

14. A hybrid helicopter according to claim 1, wherein the speeds of the rotation of the outlet from said at least one turbine engine, of said propeller, of said main rotor, and of said mechanical interconnection system are mutually proportional, the proportionality ratio being constant regardless of the flying configuration of the hybrid helicopter under normal conditions of operation.

\* \* \* \* \*